(12) United States Patent
Hambitzer et al.

(10) Patent No.: US 10,892,487 B2
(45) Date of Patent: Jan. 12, 2021

(54) RECHARGEABLE ELECTROCHEMICAL CELL

(71) Applicant: INNOLITH ASSETS AG, Basel (CH)

(72) Inventors: Guenther Hambitzer, Bonn (DE); Joachim Heitbaum, Bonn (DE); Claus Dambach, Pfinztal (DE); Martin Kampa, Mannheim (DE); Christian Pszolla, Karlsruhe (DE); Christiane Ripp, Pfinztal (DE)

(73) Assignee: INNOLITH ASSETS AG, Basel (CH)

( * ) Notice: Subject to any disclaimer, the term of this patent is extended or adjusted under 35 U.S.C. 154(b) by 300 days.

(21) Appl. No.: 14/056,556

(22) Filed: Oct. 17, 2013

(65) Prior Publication Data

US 2014/0113182 A1    Apr. 24, 2014

Related U.S. Application Data

(63) Continuation of application No. 13/578,110, filed as application No. PCT/EP2011/000506 on Feb. 4, 2011, now abandoned.

(30) Foreign Application Priority Data

Feb. 12, 2010  (EP) .................................. 10001458

(51) Int. Cl.
   *H01M 4/58*    (2010.01)
   *H01M 4/04*    (2006.01)
   (Continued)

(52) U.S. Cl.
   CPC ....... *H01M 4/5825* (2013.01); *H01M 4/0404* (2013.01); *H01M 4/0435* (2013.01);
   (Continued)

(58) Field of Classification Search
   None
   See application file for complete search history.

(56) References Cited

U.S. PATENT DOCUMENTS

| 5,145,755 A | 9/1992 | Schlaikjer et al. |
| 5,213,914 A | 5/1993 | Heitbaum et al. |

(Continued)

FOREIGN PATENT DOCUMENTS

| RU | 2 222 075 C1 | 1/2004 |
| WO | WO 00/79631 | 12/2000 |

(Continued)

OTHER PUBLICATIONS

Masataka et al. (JP, 2002-352801) (a raw machine translation) (Abstract and Detailed Description) (Dec. 6, 2002).*

(Continued)

*Primary Examiner* — Carmen V Lyles-Irving
(74) *Attorney, Agent, or Firm* — Bose McKinney & Evans LLP

(57) ABSTRACT

The present invention relates to a rechargeable electrochemical battery cell having a housing, a positive electrode, a negative electrode, and an electrolyte, the electrolyte containing sulfur dioxide and a conductive salt of the active metal of the cell. The total quantity of oxygen-containing compounds contained in the cell that are able to react with the sulfur dioxide, reducing the sulfur dioxide, is not more than 10 mMol per Ah theoretical capacitance of the cell.

29 Claims, 3 Drawing Sheets

(51) Int. Cl.
*H01M 4/136* (2010.01)
*H01M 4/1397* (2010.01)
*H01M 4/36* (2006.01)
*H01M 4/583* (2010.01)
*H01M 4/587* (2010.01)
*H01M 4/62* (2006.01)
*H01M 4/80* (2006.01)
*H01M 10/0525* (2010.01)
*H01M 10/0563* (2010.01)
*H01M 10/056* (2010.01)
*H01M 4/02* (2006.01)

(52) U.S. Cl.
CPC ....... *H01M 4/0471* (2013.01); *H01M 4/0473* (2013.01); *H01M 4/0478* (2013.01); *H01M 4/136* (2013.01); *H01M 4/1397* (2013.01); *H01M 4/366* (2013.01); *H01M 4/58* (2013.01); *H01M 4/581* (2013.01); *H01M 4/587* (2013.01); *H01M 4/5835* (2013.01); *H01M 4/62* (2013.01); *H01M 4/623* (2013.01); *H01M 4/808* (2013.01); *H01M 10/056* (2013.01); *H01M 10/0525* (2013.01); *H01M 10/0563* (2013.01); *H01M 2004/021* (2013.01); *H01M 2004/028* (2013.01); *H01M 2300/002* (2013.01); *Y02E 60/10* (2013.01)

(56) References Cited

U.S. PATENT DOCUMENTS

| | | |
|---|---|---|
| 6,511,773 B1 | 1/2003 | Dampier |
| 6,730,441 B1 | 5/2004 | Hambitzer et al. |
| 2007/0065714 A1 | 3/2007 | Hambitzer et al. |
| 2009/0011335 A1 | 1/2009 | Takeda et al. |
| 2010/0062341 A1 | 3/2010 | Hambitzer |
| 2010/0259224 A1 | 10/2010 | Zinck et al. |

FOREIGN PATENT DOCUMENTS

| | | |
|---|---|---|
| WO | WO 2005/031908 | 4/2005 |
| WO | WO 2005/031908 A2 | 4/2005 |
| WO | WO 2008/058685 | 5/2008 |
| WO | WO 2009/077140 | 6/2009 |

OTHER PUBLICATIONS

Hill et al., "Dehydroxylation of $LiAlCl_4$—$xSO_2$ Electrolytes Using Chlorine," *J. Electrochem. Soc.*, 143(11): 3585-3590 (1996).

\* cited by examiner

RECHARGEABLE ELECTROCHEMICAL CELL

This application is a continuation of U.S. patent application Ser. No. 13/578,110 filed Aug. 9, 2012, which is a National Stage Entry of International Application No. PCT/EP2011/000506, filed Feb. 4, 2011, which claims priority to EP 10 001 458.8, filed Feb. 12, 2010, all of which are hereby incorporated herein by reference in their entirety.

The invention relates to a rechargeable electrochemical battery cell having a positive electrode, a negative electrode, and an electrolyte, the electrolyte containing sulfur dioxide ($SO_2$) and a conductive salt of the active metal of the cell.

The charge transport that is necessary for charging and discharging the cell is based on the mobility of the conductive salt ions in the electrolyte. In particular the electrolyte may be a liquid or a gel. In $SO_2$-containing electrolytes (hereafter designated $SO_2$ electrolytes), the $SO_2$ contributes to the mobility of the ions of the conductive salt that carry out this charge transport. Thus the $SO_2$ serves as a solvent of the conductive salt. The electrolyte may contain another solvent to promote the mobility of the ions in the conductive salt, in addition to the $SO_2$. Such solvents may be inorganic solvents (for example sulfuryl chloride, thionyl chloride), organic solvents, and ionic liquids, which may be used individually or in a mixture. For the purposes of the invention, an electrolyte solution is preferred that not only contains a $SO_2$ in low concentration as an additive, but in which the mobility of the conductive salt ions is provided mainly, preferably entirely, by the $SO_2$.

It has long been known that $SO_2$ electrolytes offer considerable advantages (see "The Handbook of Batteries" by David Linden, 1994, McGraw Hill). One of these advantages is that its conductivity is 5 to 10 times better than with organic electrolytes normally used in lithium ion battery cells. This enables higher charge and discharge currents, which in turn result in a high power density. Good conductivity of the electrolyte is also advantageous with regard to the charge capacitance of the cell, because it allows use of relatively thick electrodes with high storage capacity for the active metal of the cell.

The various types of cells with $SO_2$ electrolyte differ from each other mainly with respect to the active metal and conductive salt used, and also with respect to the materials used for the positive and negative electrodes. The present invention is directed in particular to battery cells having the following features:

a) The active metal is preferably an alkali metal, particularly lithium or sodium. In this case, the conductive salt is preferably a tetrahalogen aluminate, more preferably a tetrachloroaluminate of the alkali metal, for example $LiAlCl_4$. In any case, for any anion of the conducting salt, the electrolyte contains at least 1 mole of the conducting salt per 22 mole $SO_2$. A preferred upper limit of the molar ratio is 1 mole of conducting salt per 0.5 mole $SO_2$. In the context of the invention, preferred active metals, besides the alkali metals, also include the alkaline earth metals and the metals of the second subgroup of the periodic system, in particular calcium and zinc. Particularly suitable conductive salts are the halides, oxalates, borates, phosphates, arsenates and gallates thereof.

b) The positive electrode preferably contains (for storing the active metal) a metal oxide or metal phosphate in the form of an intercalation compound. The metal in the oxide or phosphate is preferably a transition metal with an atomic number from 22 to 28, particular cobalt, manganese, nickel or iron. Binary or ternary oxides or phosphates containing two or three different transition metals in the matrix structure, such as lithium-nickel-cobalt oxide, also have particular practical importance. However, the invention may also be used in combination with other positive electrodes, for example on the basis of a metal halide such as $CuCl_2$.

c) The negative electrode is preferably an insertion electrode. This term is used to generally designate electrodes that contain the active metal within themselves in such manner that it is available for exchange with the electrolyte when the cell is charged and discharged. Negative electrodes containing graphite, wherein the active metal is taken up within the graphite when the cell is charged (lithium ion cells) are particularly significant, both generally and for the purposes of the present invention. When the cell is charged normally no active metal is deposited on the electrode surface.

However, the invention also relates to cells in which the active metal is metallically deposited on the negative electrode (lithium-metal cells). In this context, it is particularly preferable if the negative electrode has a porous deposition layer, whose pores take up the active mass during charging. Such an electrode is also called an insertion electrode (in a broader sense). For such a deposition layer, a glass fabric with a pore diameter of at least 6 µm may be used, for example.

d) The necessary electrical separation of the positive and negative electrodes may be assured either by a separator or by an isolator.

A separator is a structure that prevents metallic lithium deposited at the negative electrode from penetrating to the surface of the positive electrode. For cells with $SO_2$ electrolyte, in particular ceramic materials having a pore diameter of no more than 1 µm, and inert polymer materials, or also mixtures of the two materials, are suitable. Generally, separators made from polyethylene (PE), polypropylene (PP) or ethylene tetrafluoroethylene (ETFE) may also be used. However, chargers for cells of such kind should be designed so as to prevent overcharging in order to avoid undesirable reactions.

In this context, an isolator is understood to be a structure that separates the positive and negative electrodes electrically, but does not prevent metallic lithium from penetrating to the surface of the positive electrode. WO 2005/031908 describes that locally limited short-circuits occurring in this context are not necessarily harmful, but may even have positive effects. The isolator preferably serves simultaneously as a deposition layer.

The following documents contain more detailed information about battery cells with $SO_2$ electrolytes:
(1) U.S. Pat. No. 5,213,914
(2) WO 00/79631 and U.S. Pat. No. 6,730,441
(3) WO 2005/031908 and US 2007/0065714
(4) WO 2008/058685 and US 2010/0062341
(5) WO 2009/077140

Figure 1:
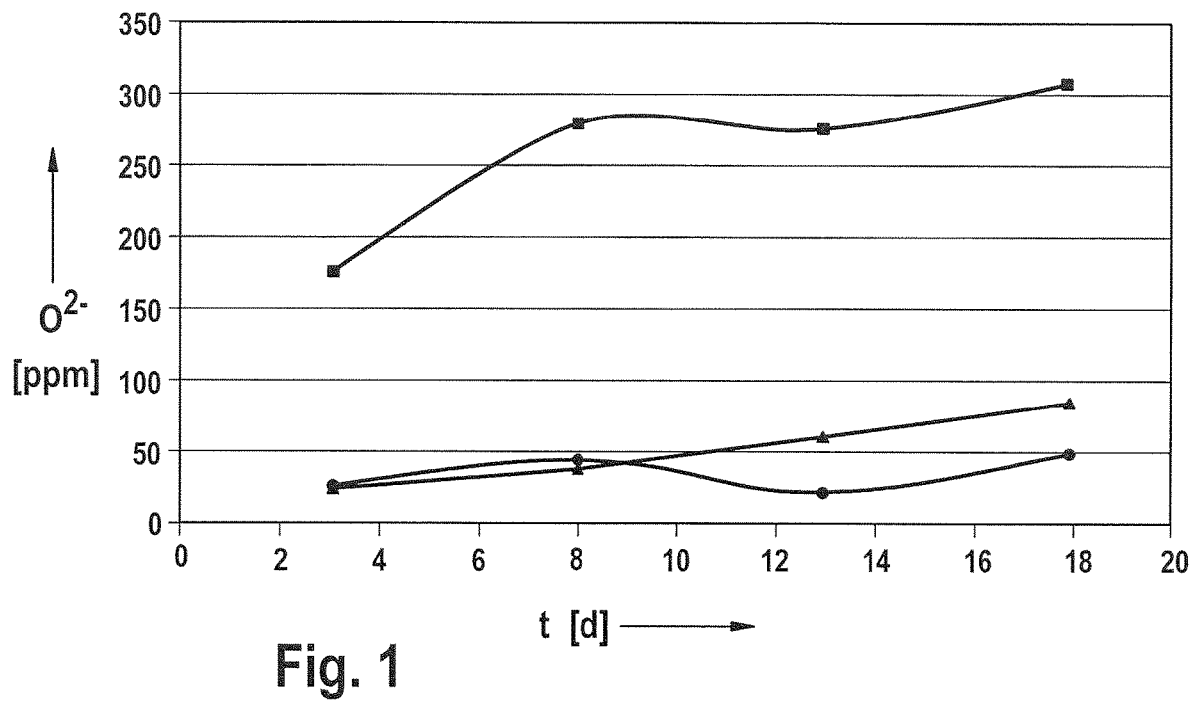
FIG. 1 is a graph that shows the $O^{2-}$ concentration (in ppm) as determined by the Karl Fischer method plotted against the time in days for three experiments with the pure electrolyte (circles), the electrolyte with a trimetal oxide electrode (squares), and the electrolyte with a graphite electrode (triangles).

It is an object of the invention is to provide battery cells with an $SO_2$ electrolyte that feature improved properties, in particular with regard to long-term operation with many charging and discharging cycles.

The object is solved by an electrochemical rechargeable battery cell having a housing, a positive electrode, a negative electrode, and an electrolyte, the electrolyte containing sulfur dioxide and a conductive salt of the active metal of the cell, which is characterized in that the total quantity of oxides contained in the cell that are able to react with sulfur dioxide and reduce the sulfur dioxide, is no more than 10 mMol for each Ah theoretical capacitance of the cell.

In the context of the invention, it has been found that certain oxygen-containing contaminants can severely impair the long-term function of battery cells that include an electrolyte containing $SO_2$. These are oxygen-containing compounds that are able to react with and reduce the sulfur dioxide, that is to say, they are capable of such a reaction under the conditions that may occur during operational use of the battery. Oxygen-containing compounds of such kind will be designated hereafter as "disturbing oxides", as a non-limiting abbreviation. The reactions at issue are often highly inhibited, so that they only take place over a very long period. However, in view of the fact that batteries must remain functional for long periods (several years), even such slow reactions still impair battery function.

This observation applies for both lithium ion cells and lithium metal cells. In the context of the invention, it has been determined that the presence of metallic lithium does not affect the reactions of the disturbing oxides. This is true regardless of whether local short-circuits may occur (isolator) or whether the active metal is effectively kept separate from the positive electrode (separator). In both cases, even a small quantity of disturbing oxides is capable of very significantly reducing the cell's capacitance.

It is particularly surprising that even very low concentrations of disturbing oxides are capable of massively impairing the cell's function. For example, a SubC size cell that was tested in the context of the invention has a theoretical discharge capacitance of 2.3 Ah. The function of such a cell may be affected by as little as about 5 to 10 mMol disturbing oxide so severely that during long-term use, with many charging and discharging cycles, its capacitance goes down to zero.

The theoretical charge capacitance of the cell depends on its electrodes. In the context of the invention the theoretical capacitance of the positive electrode is taken to be the theoretical capacitance of the cell. This is the maximum theoretical charge of the active metal that can be stored in the electrode, i.e. the amount of electrical charge corresponding to the maximum quantity of active metal that the positive electrode may contain according to stoichiometric calculation. This value is always greater than the actually achievable maximum capacitance of the electrode (and thus also of the cell), because the charge amount that can theoretically be stored can never be fully drawn from the electrode in practice.

If the content of disturbing oxides in the cell is below the limit values determined in the context of the invention, the cell's long-term function is significantly improved thereby. In particular, the electrical charge capacitance remains essentially stable over many charging and discharging cycles. Overcharging resistance is also significantly improved, i.e. the cell's function is not destroyed even by overcharging.

As was explained in the introduction, the invention primarily relates to cells with an electrolyte whose $SO_2$ content is so high that the mobility of the conductive salt ions is based mainly, or even entirely, on the presence of the $SO_2$. The minimum quantity of $SO_2$ per Ah theoretical capacitance of the cell is preferably 1 mMol, wherein a minimum quantity of 5 mMol is particularly preferred and a minimum quantity of 10 mMol is especially preferred, relative to the theoretical capacitance of the cell in each case.

Having the knowledge of the invention, it is possible to explain its effect by a plurality of reactions, usually involving several elements of the cell (electrodes, electrolyte). This will be explained hereafter with reference to an electrochemical cell having a carbon-based negative electrode and a metal oxide-based positive electrode.

a) Reactions of Disturbing Oxides During Charging and Discharging

When the cell is charged and discharged normally (without overcharging), according to the inventors' present understanding, the reactions by disturbing oxides described hereafter cause the sulfur dioxide to be reduced and ultimately result in a loss of charge capacitance.

a1) Direct reaction by disturbing oxides present at the active material of the negative electrode A typical oxygen-containing contamination at the active material of a negative carbon electrode is $C_6O$. It reacts with the $LiC_6$ of the electrode and the $SO_2$ of the electrolyte, consuming six electrons ($e^-$) according to the following reaction equation:

$$6LiC_6 + C_6O + 2S^{(+IV)}O_2 \rightarrow 7C_6 + Li_2S^{(+II)}_2O_3 + 2Li_2O;$$
Charge consumption $6e^-$   (1)

The reaction products are carbon ($C_6$), lithium thiosulfate ($Li_2S_2O_3$) and lithium oxide ($Li_2O$).

The superscripted Roman numerals in parentheses indicate the oxidation number of the sulfur in the respective compound. The oxidation number of the sulfur is lowered by 2 during the reaction. The sulfur dioxide is thus reduced as the lithium thiosulfate is formed.

a2) Indirect Reaction by Disturbing Oxide at the Active Material of the Negative Electrode The presence of the disturbing oxide $C_6O$ indirectly causes the following reaction sequence, which is accompanied by a reduction of the sulfur dioxide, ultimately forming lithium thiosulfate:

$$2Li_2O+2AlCl_3 \rightarrow 2AlOCl+4LiCl; \quad (2)$$

$$4Li_2S^{(+III)}{}_2O_4+2AlOCl+2AlCl_3+8LiC_6 \rightarrow 4Li_2S^{(+II)}{}_2O_3+2Al_2O_3+8LiCl+8C_6; \text{ Charge consumption } 8e^- \quad (3a)$$

According to (2), the lithium oxide formed in reaction equation (1) reacts with aluminum chloride ($AlCl_3$), a Lewis acid that is usually present in the electrolyte as a result of the autodissociation of the conductive salt, to produce aluminum oxychloride (AlOCl) and lithium chloride (LiCl). But also the neutral form of the conductive salt ($LiAlCl_4$) may result in the dissolution of the $Li_2O$ and further reaction with $Li_2S_2O_4$:

$$2Li_2O+2LiAlCl_4 \rightarrow 2LiAlOCl_2+4LiCl \quad (2')$$

$$4Li_2S^{(+III)}{}_2O_4+2LiAlOCl_2+2LiAlCl_4+8LiC_6 \rightarrow 4Li_2S^{(+II)}{}_2O_3+2Al_2O_3+12LiCl+8C_6; \text{ Charge consumption } 8e^- \quad (3a')$$

Regarding the subsequent reaction (3a), it should be noted that in this type of cells, a covering layer of lithium dithionite (usually advantageous for the function of the cell, and therefore desirable) is present. This covering layer has been formed according to $$8LiC_6+8SO_2 \rightarrow 8C_6+4Li_2S_2O_4; \text{ Charge consumption } 8e^- \quad (4a)$$

from the $LiC_6$ of the electrode and the $SO_2$ of the electrolyte, with consumption of eight electrons. It consists of lithium dithionite ($Li_2S_2O_4$). This compound of the covering layer reacts further according to (3a). $SO_2$ in the lithium dithionite is in turn reduced (the oxidation number of the sulfur is lowered from +III to +II), and lithium thiosulfate is formed.

The presence of one molecule of $C_6O$ results in the consumption of a total of 10 molecules $SO_2$ and 22 $e^-$ (wherein 5 molecules of $Li_2S_2O_3$ are formed). Expressed in other terms, this means that 594 mAh charge are irreversibly consumed for every mMol $C_6O$.

In the preceding calculations, it is also necessary to consider the solubility of the reaction products lithium thiosulfate ($Li_2S_2O_3$) and lithium oxide ($Li_2O$) produced by reaction (1). If the $Li_2O$ does not dissolve, reaction (2) cannot take place, whereby subsequent reactions (3a) and (4a) also do not occur. The charge consumption is consequently only $6e^-$ resulting from reaction (1). Expressed in other terms, in this case 162 mAh charge are irreversibly consumed for every mMol $C_6O$.

If the $Li_2O$ dissolves but the $Li_2S_2O_3$ does not, reaction (4a) does not take place. In this case, the charge consumption is lowered to $14e^-$. This means that 378 mAh charge are irreversibly consumed for every mMol $C_6O$.

The capacitance loss due to disturbing oxides at the active material of the negative electrode is thus between 162 and 564 mAh, depending on the solubility of the mentioned components, (which is also affected by temperature and $SO_2$ concentration, among other factors).

a3) Reactions Due to Disturbing Oxides at the Active Material of the Positive Electrode A typical oxygen-containing contamination at the active material of the positive electrode is a hydroxide that forms on the surface thereof. In the case of a lithium metal oxide electrode of the general formula $LiMeO_2$ it may, for example, be $LiMeO(OH)_2$. It reacts with the $AlCl_3$ in the electrolyte according to the following reaction equation to form aluminum oxychloride, a chloride of the metal Me, HCl, and LiCl:

$$LiMeO(OH)_2+3AlCl_3 \rightarrow 3AlOCl+MeCl_3+2HCl+LiCl \quad (5)$$

The hydroxide may also react with the neutral form of the conductive salt in accordance with:

$$LiMeO(OH)_2+3LiAlCl_4 \rightarrow 3LiAlOCl_2+MeCl_3+2HCl+LiCl \quad (5')$$

The aluminum oxychloride formed thereby reacts further with the lithium dithionite covering layer as shown in the following equations (3b) and (4b). These equations differ from (3a) and (4a) only in the molar numbers, and therefore do not need to be fully explained again:

$$6Li_2S^{(+III)}{}_2O_4+3AlOCl+3AlCl_3+12LiC_6 \rightarrow 6Li_2S^{(+II)}{}_2O_3+3Al_2O_3+12LiCl+12C_6; \text{ Charge consumption } 12e^- \quad (3b)$$

Of course, the reaction path via lithium aluminum oxychloride ($LiAlOCl_2$), similarly to (3a'), is also possible here.

$$12LiC_6+12SO_2 \rightarrow 12C_6+6Li_2S_2O_4; \text{ Charge consumption } 12e^- \quad (4b)$$

Overall, the presence of one molecule of $LiMeO(OH)_2$ results in the consumption of 12 $SO_2$ molecules and 24 $e^-$, while 6 molecules of $Li_2S_2O_3$ and 2 molecules of HCl are formed (with 3 molecules of AlOCl formed as an intermediate product). The charge consumption is equivalent to a charge quantity of 702 mAh for every mMOl $LiMeO(OH)_2$. Moreover, the lithium in one molecule of $LiMeO(OH)_2$ is no longer available as an active metal. This represents a further capacitance loss of 27 mAh per mMol $LiMeO(OH)_2$. Accordingly, if the reactions proceed to completion, a capacitance of 729 mAh is lost per mMol $LiMeO(OH)_2$. This corresponds to 243 mAh per mole oxygen because every mole of the disturbing oxide contains three moles of oxygen.

As mentioned before, reactions (3b) and (4b) only take place if the lithium thiosulfate formed according to (3a) is dissolved and consequently lithium dithionite is reproduced in accordance with (4b). If this does not happen, the charge consumption is reduced to 12 $e^-$. This is equivalent to the irreversible loss of a capacitance of 351 mAh for every mMol $LiMeO(OH)_2$. Again, a capacitance loss of 27 mAh due to consumed active metal must be added. In this case, the overall capacitance loss is 378 mAh, i.e. 126 mAh per mole oxygen.

a4) Reactions Due to Disturbing Oxides in the Electrolyte Solution

Other oxygen-containing contaminations occur when the electrolyte solution is manufactured or due to the reaction of the electrolyte solution with other components of the cell (for example the housing, the separator, the current collectors to and from the electrodes). Typically these are acidic (AlOCl) or neutral ($LiAlOCl_2$) aluminum oxychlorides, leading to the following reactions, wherein reaction equations (3c) and (4c) are again equivalent to (3a) and (4a) except for the molar numbers.

$$2Li_2S^{(+III)}{}_2O_4+AlOCl+AlCl_3+4LiC_6 \rightarrow 2Li_2S^{(+II)}{}_2O_3+2Al_2O_3+4LiCl+4C_6; \text{ Charge consumption } 4e^- \quad (3c)$$

Again, the alternative reaction path similar to (3a') is possible.

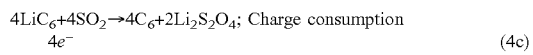
$$4LiC_6 + 4SO_2 \rightarrow 4C_6 + 2Li_2S_2O_4; \text{ Charge consumption } 4e^- \quad (4c)$$

The presence of one molecule of AlOCl results in the consumption of 4 $SO_2$ molecules and 8 $e^-$, while 2 molecules of $Li_2S_2O_3$ are formed. The corresponding charge consumption is 216 mAh for each mMol AlOCl.

If the lithium thiosulfate is not dissolved, the charge consumption is correspondingly reduced in this case as well, to 4 $e^-$. This is equivalent to 108 mAh.

The current collectors to and from the electrodes are often made from nickel or a nickel alloy. The surface of these components may be oxidized, that is to say, it may contain nickel oxide. If this nickel oxide has not (yet) been dissolved in the electrolyte solution, a direct reaction similar to reaction equation (1) may occur, producing $Li_2S_2O_3$ when the cell is charged.

b) Secondary Reactions Caused by Disturbing Oxides During Overcharging

When the cell is overcharged, the charge voltage increases. Above a certain voltage, which varies according to cell type, this increase in charge voltage causes decomposition of the electrolyte solution. If the solution contains for example a tetrachloroaluminate as the conductive salt, chlorine ($Cl_2$) is formed on the positive electrode as an overcharging product. This in turn leads to other reactions, in which the lithium thiosulfate, formed according to the reactions described before, makes a series of further reactions with the chlorine diffused to the negative electrode and with the $LiC_6$ of the negative electrode. In these reactions the sulfur is disproportionated until it reaches oxidation number −II in one final product, and oxidation number +VI in another final product. Examples of final products with oxidation number −II are metal sulfides (such as $Li_2S^{(-II)}$ or $Al_2S^{(-II)}{}_3$). An example of a final product with oxidation number +VI is lithium chlorosulfonate ($LiSO_3Cl$).

The net equation of this multistage reaction may be expressed as follows:

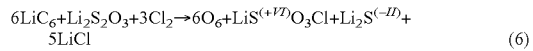
$$6LiC_6 + Li_2S_2O_3 + 3Cl_2 \rightarrow 6O_6 + LiS^{(+VI)}O_3Cl + Li_2S^{(-II)} + 5LiCl \quad (6)$$

6 $e^-$ are required in order to reduce one molecule of $Li_2S^{(+II)}{}_2O_3$ to sulfur compounds in accordance with equation (6). In other terms, this means that 162 mAh of capacitance are irreversibly lost in the reaction of one mMol lithium thiosulfate.

In summary, the preceding explanations show that the presence of disturbing oxides leads to the formation of a sulfur-oxygen compound when a cell is charged and discharged normally (without overcharging), and the sulfur in this compound may reach a maximum oxidation number of +III. One important example is a thiosulfate of the active metal (in the case of a lithium cell lithium thiosulfate). In the reaction sequence, sulfur dioxide in the electrolyte is reduced. If the cell is overcharged, giving rise to overcharge products, further reactions follow in which the sulfur of the thiosulfate is disproportionated to form sulfur compounds having oxidation numbers −II and +VI. A characteristic reaction product that is formed if the cell is overcharged in the presence of disturbing oxides is a chlorosulfonate of the active metal. In a lithium cell, this is lithium chlorosulfonate. The electrical charge quantity required for these reactions is provided by the cell, and is no longer available as usable battery capacitance.

The disturbing oxides named in the preceding are to be understood as exemplary of all types of disturbing oxides (in the sense of the definition provided above) that are present on or in the cell materials.

For example, the positive electrode may contain disturbing oxides in the form of various oxide-containing compounds present on the surface of the electrode material. These include hydroxides (including water), oxide dihydroxides, carbonates, borates, and others.

Similarly, the formula $C_6O$ serves as a simplified representation of an oxygen that is bound to a negative carbon electrode. The graphite surface contains covalently bonded oxygen, for example as ketones, aldehydes, carbonyls, alcohols, epoxides, carboxylic acids, and others. The oxygen may also be present as adsorbed water or adsorbed metal hydroxide or similar.

However, the inventors have observed that a common property of all disturbing oxides is that they are able to react with the sulfur dioxide in the electrolyte, reducing the sulfur dioxide. When the cell is operating normally (without overcharging) a sulfur-oxygen compound is typically formed in which the sulfur has a maximum oxidation level of III, for example a thiosulfate of the active metal. During overcharging, a sulfur-oxygen compound is typically produced that also contains a halogen, and in which the oxidation level of the sulfur is +VI. For example, a chlorosulfonate of the cell's active metal is formed.

The following table summarizes the described relationship between the concentration of oxygen in disturbing oxides (O in StO) at the negative electrode (NE), the positive electrode (PE), and in the electrolyte:

TABLE 1

| | Charging and discharging | | Over-charging | Total |
|---|---|---|---|---|
| Site | $SO_2$ consumed | $Li_2S_2O_3$ formed | Cap. loss mAh/ mMol O in StO | Cap. loss mAh/ mMol O in StO | Cap. loss mAh/ mMol O in StO |
| NE | 2-10 mMol | 1-5 mMol | 162-594 | 810 | 1404 |
| PE | 0-12 mMol | 6 mMol | 126-243 | 324 | 567 |
| Electrolyte | 0-4 mMol | 2 mMol | 108-216 | 324 | 540 |

Since the capacitance loss during charging and discharging (as explained) depends on the solubility of the components in the electrolyte, the corresponding ranges are shown in the table. The same applies for the $SO_2$ consumption, which is also variable according to the solubility of the reaction components. Depending on the initial concentration of the $SO_2$, the function of the cell may also be impaired or destroyed by the $SO_2$ consumption, because the charge transport in the electrolyte depends on the $SO_2$ concentration.

According to the inventors' observations, the reactions that were previously inhibited by poor solubility take place during overcharging. For this reason, for capacitance loss during overcharging, only one value is indicated.

As the table shows, disturbing oxides contained in an electrolyte are responsible for the relatively smallest capacitance loss per mMol. The numerical value of about 100 mAh/mMol shows that, if the disturbing oxide in the electrolyte reacts to completion (without the overcharging reactions described), the cell capacitance goes down to zero if the electrolyte contains more than about 10 mMol disturbing oxide per Ah theoretical capacitance of the cell, even if no other disturbing oxides are present in the cell.

In practice, however, it should be borne in mind that depending on the field of application of the battery, operating conditions may exist in which the disturbing oxides only partially react. This applies for instance with batteries designed for low-temperature applications, or battery systems in which appropriately designed chargers reliably prevent overcharging of the battery cell. In these cases, higher concentrations of disturbing oxides may be tolerable.

Conversely, where strict requirements regarding the long-term stability of the cell and unfavorable operating conditions exist (for example high temperature applications), the cell should contain smaller overall quantities of disturbing oxides. According to preferred embodiments, the cell therefore contains not more than 5 mMol, preferably not more than 2 mMol, especially not more than 1 mMol, particularly preferably not more than 0.5 mMol, and most preferably not more than 0.1 mMol of disturbing oxides per Ah theoretical capacitance of the cell.

In the context of the invention, experiments were conducted in which typical materials for the positive and negative electrodes, namely graphite and a trimetal oxide [Ln(Ni$_{0.77}$Co$_{0.13}$Mn$_{0.1}$)O$_2$] were kept at 60° C. for eighteen days in an electrolyte solution having the formula LiAlCl$_4$× 1.5 SO$_2$. The Karl Fischer value, an indicator of the disturbing oxides contained in the electrolyte, was recorded several times during this storage. The results are shown in FIG. 1. This figure shows the O$^{2-}$ concentration in ppm, as determined by the Karl Fischer method, plotted against the time in days for three experiments, namely with the pure electrolyte (circles), the electrolyte with trimetal oxide (squares), and the electrolyte with graphite (triangles).

The following conclusions can be drawn therefrom:

- The electrolyte contains very low quantities of O$^{2-}$, the variation of the curve being within the error margin
- In the experiment with trimetal oxide, a rise followed by a plateau and then another rise is apparent. This indicates that at least two disturbing oxides were present, which were dissolved at different rates.
- In the experiment with the graphite, the increase in O$^{2-}$ is very small. At any rate it is less pronounced than with the trimetal oxide. Based on the knowledge of the inventors, this is due to the fact that only a small fraction of the disturbing oxides present on the graphite is readily dissolved in the electrolyte solution. According to the present knowledge of the inventors, these are disturbing oxides that are not covalently bonded. However, this does not mean that there are no larger quantities of disturbing oxides present on the graphite. On the contrary, further experimental investigations showed that relatively large quantities of disturbing oxides are present on normal graphite, but they are covalently bonded and therefore only react when the cell is being charged.

Figure 2:
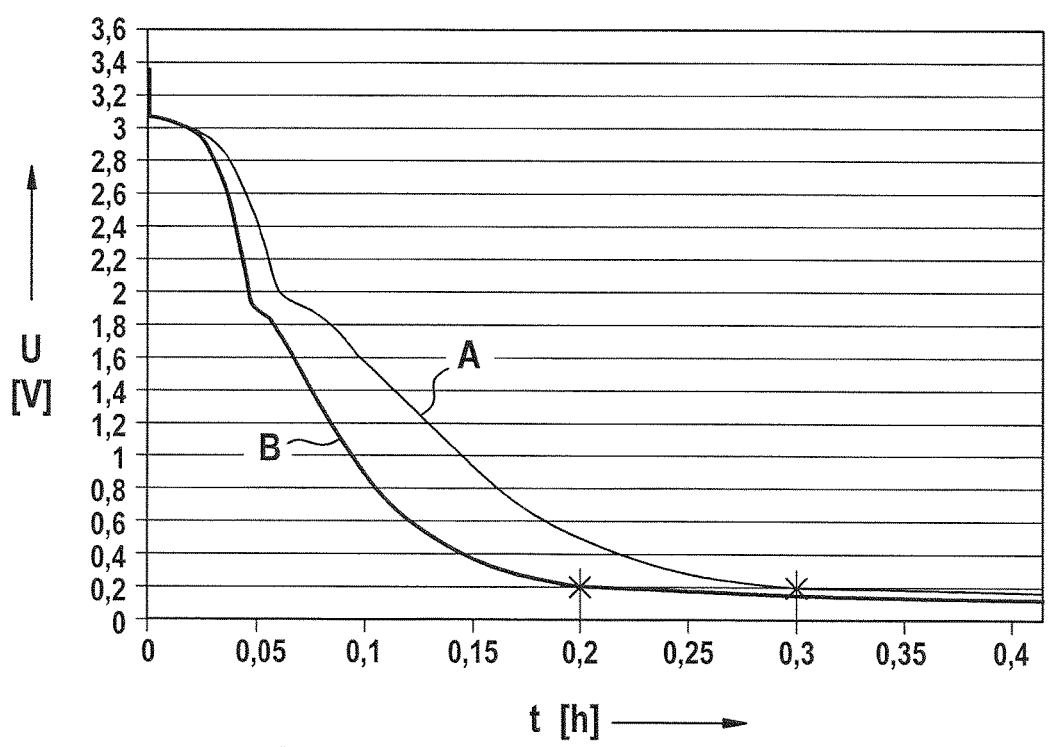
FIG. 2 is a graph that shows voltage-time curve measurements from cells having a three electrode configuration. The figure plots the electrical voltage U in Volts against the time t in hours for the first charge (at a constant current of 11 mA) of cells using two different negative graphite electrodes. Curve "A" is a plot of voltage over time from a cell employing a commercial graphite electrode without further treatment. Curve "B" is a plot of voltage over time from a cell employing a graphite electrode treated for 90 hours at 1000° C. in a kiln containing argon as a protective gas.

The results of such an experiment are shown in FIG. 2. This relates to electrochemical measurements with a cell having a three electrode configuration. The figure plots the electrical voltage U in Volts against the time t in hours for the first charge of two different negative graphite electrodes. For the first electrode, commercial graphite without further treatment was used. The second electrode was treated for 90 hours at 1000° C. in a kiln containing an argon protective gas, in order to remove the disturbing oxides.

The cell was charged with both electrodes at a constant current of 11 mA. In the figure, the resulting voltage-time curves are shown with A for the untreated electrode, and B for the pretreated electrode.

When a negative electrode is charged for the first time, covering layers form on the graphite, specifically a covering layer of lithium dithionite, which is advantageous for the function of the cell, and an undesirable covering layer of lithium thiosulfate, which is formed because of the presence of disturbing oxides. Other experiments have shown that formation of the covering layer is completed when the voltage is at 0.2 Volt. FIG. 2 shows that this voltage value was reached after 0.2 hours for the treated electrode and after 0.3 hours for the untreated electrode. Since the current flow was constant at 11 mA, it was possible to calculate a consumed charge quantity of 2.2 mAh for the pretreated, essentially oxide-free electrode, and 3.3 mAh for the untreated electrode. This shows that normal graphite contains relatively large quantities of disturbing oxides, which react when the cell is charged for the first time.

Other experiments were conducted with various materials that are suitable for use as positive electrodes. Commercially available forms of each of the materials listed in the table below were stored in electrolyte solution for 21 days at 60° C. The increase in the disturbing oxide content of the electrolyte was measured using the Karl Fischer method. It corresponds to the release of disturbing oxides by the electrode material. The results are shown in table 2 below.

TABLE 2

| Material | Formula | Disturbing oxide content |
| --- | --- | --- |
| Lithium cobalt oxide | LiCoO$_2$ | 33,000 ppm |
| Lithium iron phosphate | LiFePO$_4$ | 1,600 ppm |
| Trimetal oxide batch 1 | Li(Ni$_{0.77}$Co$_{0.13}$Mn$_{0.1}$)O$_2$ | 2,800 ppm |
| Trimetal oxide batch 2 | Li(Ni$_{0.77}$Co$_{0.13}$Mn$_{0.1}$)O$_2$ | 4,500 ppm |

The disturbing oxide content in lithium cobalt oxide is extremely high. Although the values for the other electrode materials are approximately an order of magnitude lower, even these values are so high that the function of the cell would be severely impaired if the materials were used without prior treatment.

Similar experiments were also performed with other materials used in cells according to the invention. For example, the disturbing oxide content of nickel foam (commonly used as conducting-off element for the electrodes) and glass fabric (commonly used as a isolator between the electrodes) was determined, in each case in the commercially available form. The materials were kept in electrolyte solution for seven days at 60° C. The resulting increase in the disturbing oxide content of the electrolyte was measured using the Karl Fischer method. The following disturbing oxide contents were determined:

TABLE 3

| Material | Disturbing oxide content |
| --- | --- |
| Nickel foam | 19.2 ppm |
| Glass fabric | 33.8 ppm |

Figure 3:
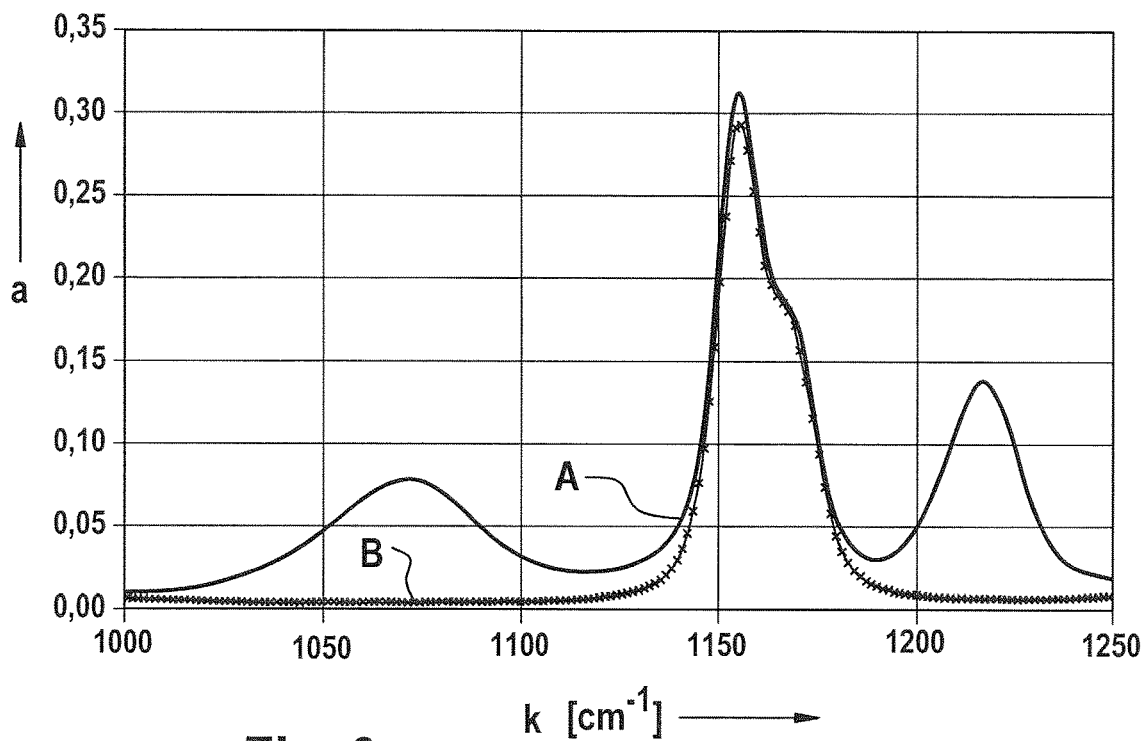
FIG. 3 shows the result of Fourier Transformation Infrared (FTIR) spectroscopy measurements on an electrolyte with composition $LiAlCl_4 \times 1.5\ SO_2$, taken from a cell after about 550 charging and discharging cycles (solid line A) compared with the same electrolyte before it had been cycled (thin line B with crosses). Absorbance is plotted in arbitrary units against the wave number k in $cm^{-1}$. The spectrum shows the maxima for chlorosulfonate at about 1218 $cm^{-1}$ and 1070 $cm^{-1}$. The pronounced peak at about 1160 $cm^{-1}$ may be attributed to the sulfur dioxide.

Of course, other methods of chemical analysis, besides the Karl Fischer method, may also be used to determine the presence of disturbing oxides or of reaction products formed by the reactions of the disturbing oxides in the cell. For example, FIG. 3 shows results of measurements performed using Fourier Transformation Infrared (FTIR) spectroscopy. The figure shows the FTIR spectrum of an electrolyte with composition LiAlCl$_4$×1.5 SO$_2$, which was taken from a cell after about 550 charging and discharging cycles (solid line A) compared with the same SO$_2$ electrolyte before it had been cycled (thin line B with crosses). Absorbance a was plotted in arbitrary units against the wave number k in cm$^{-1}$. The spectrum shows typical maxima for the chlorosulfonate at about 1218 cm$^{-1}$ and 1070 cm$^{-1}$. The pronounced peak at about 1160 cm$^{-1}$ may be attributed to the sulfur dioxide in the electrolyte solution. The formation of chlorosulfonate as a result of the cycling is evident.

Figure 4:
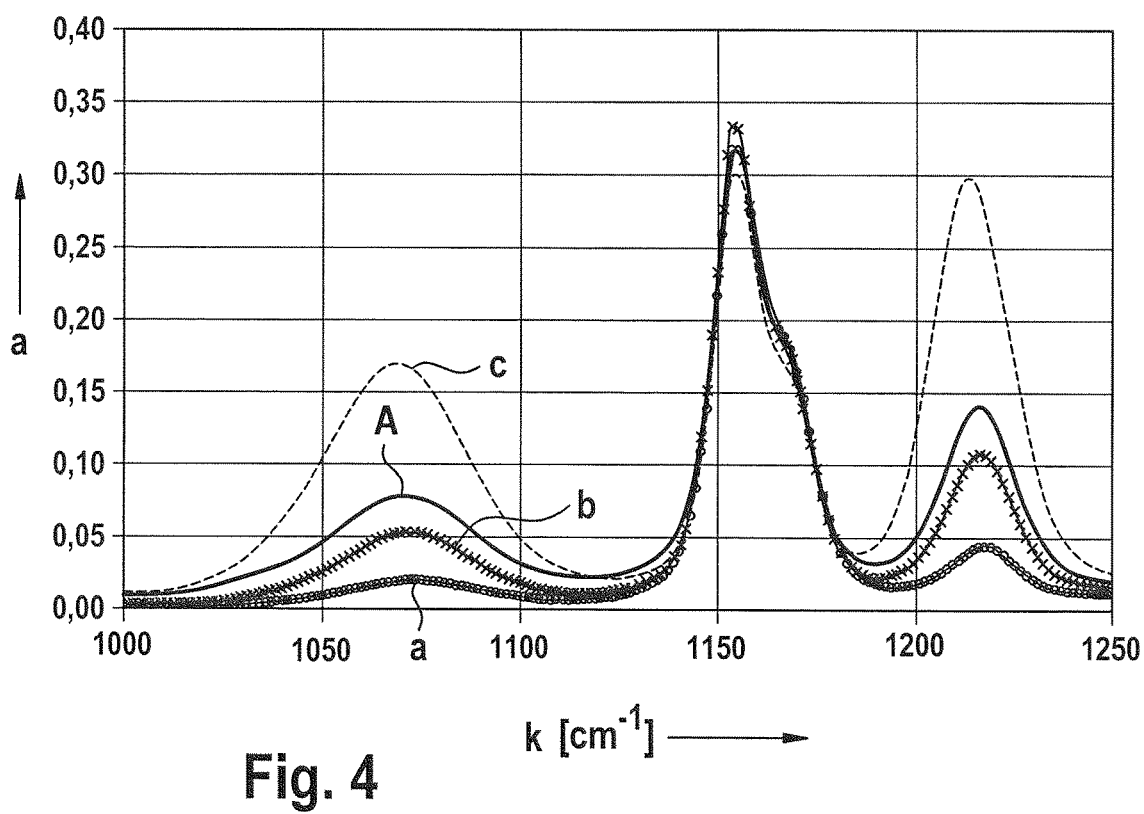
FIG. 4 shows a measurement of $SO_2$ corresponding to FIG. 3 for an electrolyte of a cycled cell (plot A as in FIG. 3) and for 3 calibration solutions that contained 1% (line a), 3% (line b) and 10% (line c) of chlorosulfonate by weight.

It is possible to perform a quantitative determination of the characteristic reaction product by appropriate calibration. FIG. 4 shows a measurement corresponding to FIG. 3 for the SO$_2$ electrolyte of a cycled cell (plot A as in FIG. 3) and for 3 calibration solutions that contained one percent by weight of chlorosulfonate (plot a), 3% chlorosulfonate (plot b), and 10% by weight chlorosulfonate (plot c).

Production of Starter Materials Containing Little or No Disturbing Oxides

With the knowledge of the invention, one skilled in the art would recognize various options for reducing the disturbing oxide content of the components in the cell taking into account the following explanations.

a) Positive Electrode

The disturbing oxide content of the material of the positive electrode may be reduced by heating to elevated temperatures, wherein both the entire electrode (active material and current collector) and the active material alone may be subjected to the heat treatment. In general, a high temperature is advantageous but it must not be so high that fresh disturbing oxides are created (particularly due to reactions of a binding agent present in the electrode material). In the context of the invention, it was determined that if excessively high temperatures are used, carbon formed by the reduction of the binding agent in turn reduces the lithium metal oxide to a metal oxide, with the production of lithium oxide and carbon dioxide:

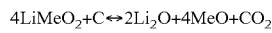

4LiMeO$_2$+C↔2Li$_2$O+4MeO+CO$_2$

With the knowledge of the invention, it is easily possible to synchronize the binding agent and the temperature in such manner that the content of disturbing oxides is reduced to non-critical values.

b) Negative Electrode

Heat treatment can also be applied to reduce the disturbing oxides content of the negative electrode to a value below the critical limit. For this, the graphite material or the entire electrode, including the current collector, is heated to above 1000° C. in an inert gas atmosphere.

The resulting material is practically free from oxides, and has a consistency that is completely different to that of normal graphite. It flows like a liquid. Therefore, a special process is required in order to manufacture the negative electrode from oxide-free graphite. In order to bond the oxide-free graphite particles, for example, another carbon material may be added (for example graphite that has been heated to 500° C., in a 15% concentration). Such an addition is sufficient to modify the flow behavior of the largely oxide-free graphite to such an extent that an electrode may be produced.

c) Electrolyte Solution

One option for lowering the disturbing oxide content in an SO$_2$ electrolyte solution is to dry the lithium chloride (LiCl) starter substance. To this end, the salt is heated for example to 450° C. for 12 hours in an argon atmosphere.

The precise conditions of the treatment for reducing disturbing oxides must be adapted individually to each material and each electrode. In light of the present invention, various processes may be experimented with, and the result of such experimentation may be tested using the Karl Fischer method or some electrochemical measurement method.

In general, it is also possible to eliminate disturbing oxides from the cell by covering the components in question with a barrier layer, which will prevent any oxide on the corresponding component from reacting with the sulfur dioxide in the electrolyte, and thereby reducing the sulfur dioxide. For example, the option exists to coat a graphite electrode (or the active mass thereof) with a thin layer of an inert ceramic material that is permeable to the ions of the conductive salt, particularly (Al$_2$O$_3$). In this case too, it may be determined experimentally whether the oxide has been blocked sufficiently to prevent it from reacting with the sulfur dioxide, reducing the sulfur dioxide, and is no longer a disturbing oxide.

Comparison of Cells with Different Contents of Disturbing Oxide

Figure 5:
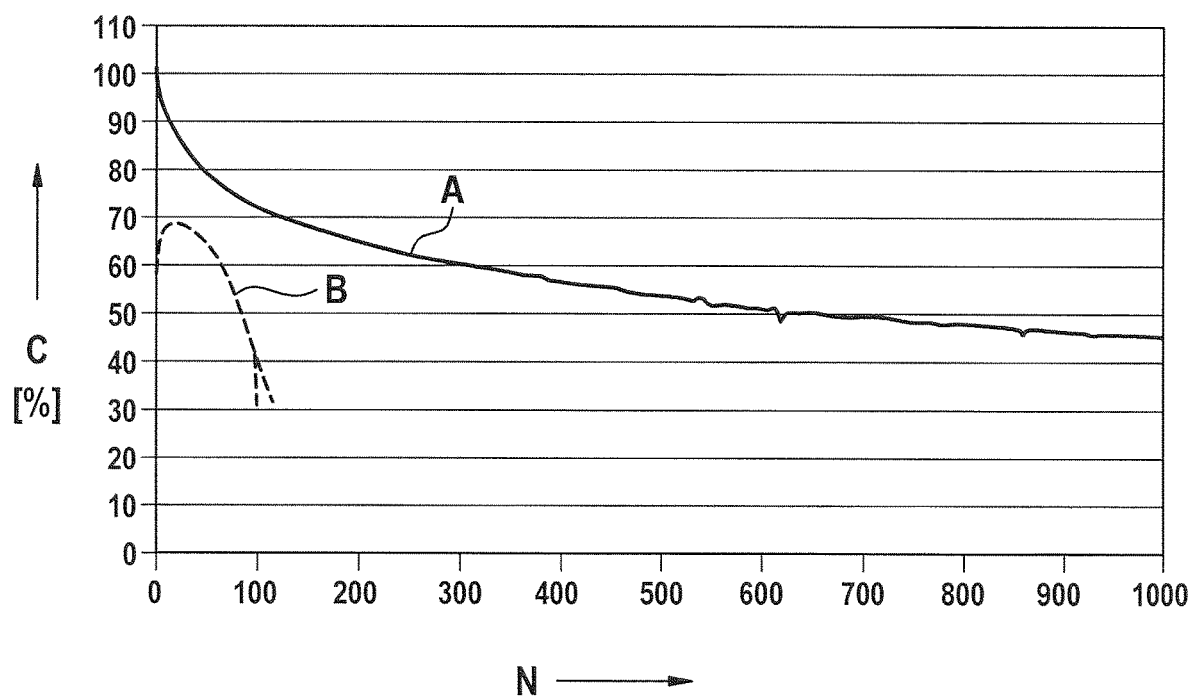
FIG. 5 shows the discharge capacitance C (as a percentage of the initial capacitance) plotted against cycle number N for two different cells with different disturbing oxide contents. Curve A shows the behavior of a cell containing about 0.25 mMol of oxygen in disturbing oxides on the positive electrode, about 0.25 mMol oxygen in disturbing oxides in the electrolyte, and about 1.1 mMol of oxygen in disturbing oxides on the negative electrode (a total oxygen content of 1.6 mMol per Ah theoretical capacitance of the cell in each case). Curve B shows the cycle behavior of a cell with about 12 mMol oxygen contained in disturbing oxides per Ah theoretical capacitance of the cell.

FIG. 5 shows the behavior of two cells with different disturbing oxide contents. The discharge capacitance C (shown as a percentage of the initial capacitance) is plotted against cycle number N.

Curve A shows the cycle behavior of a cell containing about 0.25 mMol of oxygen in disturbing oxides on the positive electrode, about 0.25 mMol oxygen in disturbing oxides in the electrolyte, and about 1.1 mMol of oxygen in disturbing oxides on the negative electrode. Accordingly, the total content of oxygen in disturbing oxides was 1.6 mMol (per Ah theoretical capacitance of the cell in each case).

Curve B describes the cycle behavior of a cell with about 12 mMol oxygen contained in disturbing oxides per Ah theoretical capacitance of the cell.

The cell with fewer disturbing oxides (curve A) still has a usable capacitance of about 50% after a thousand cycles, whereas the capacitance of the cell with the higher disturbing oxide content drops to very low levels even after fewer than a hundred cycles.

The cell with the lower disturbing oxide content had a capacitance of 1125 mAh after the lithium dithionite covering layer was formed. After 1000 cycles, it had a capacitance of approximately 414 mAh, capacitance loss was thus in the order of 709 mAh. With due allowance for measurement accuracy, this value corresponds well to the capacitance loss that may be calculated on the basis of the considerations outlined above.

The invention claimed is:

1. Rechargeable electrochemical battery cell, comprising:
   a housing,
   a positive electrode,
   a negative electrode,
   an active metal,
   an electrolyte which contains sulfur dioxide and a conductive salt of the active metal, and
   a total quantity of oxygen contained in compounds which are able to react with sulfur dioxide in a reaction by which the sulfur dioxide is reduced of not more than 10 mMol per Ah theoretical charge capacitance of the rechargeable electrochemical battery cell, wherein the compounds which are able to react with sulfur dioxide are on each or in each of the positive electrode, the negative electrode, and the electrolyte.

2. The rechargeable electrochemical battery cell according to claim 1, wherein the total quantity of oxygen in the cell that is contained in compounds which are able to react with the sulfur dioxide in a reaction by which the sulfur dioxide is reduced, is not more than 0.1 mMol per Ah theoretical charge capacitance of the cell.

3. The battery cell according to claim 1, wherein, as the reaction product of the reaction by which the sulfur is reduced, a sulfur-oxygen compound is formed in which the sulfur has an oxidation level not exceeding +III.

4. The battery cell according to claim 1, wherein, as the reaction product of the reaction by which the sulfur is reduced, a sulfur-oxygen compound is formed, which compound additionally contains a halogen and in which compound the oxidation level of the sulfur is +VI.

5. The battery cell according to claim 1, wherein the electrolyte contains at least 1 mMol sulphur dioxide per Ah theoretical charge capacitance of the cell.

6. The battery cell according to claim 1, wherein the electrolyte contains at least 10 mMol sulfur dioxide per Ah theoretical charge capacitance of the cell.

7. The battery cell according to claim 1, wherein the active metal is selected from the group consisting of the alkali metals, alkaline earth metals, and metals of the second subgroup of the periodic system.

8. The battery cell according to claim 7, wherein the active metal is lithium, sodium, calcium, zinc, or aluminum.

9. The battery cell according to claim 1, wherein the negative electrode is an insertion electrode.

10. The battery cell according to claim 9, wherein the negative electrode contains carbon.

11. The battery cell according to claim 1, wherein the positive electrode contains a metal oxide or a metal halide or a metal phosphate.

12. The battery cell according to claim 11, wherein the positive electrode contains an intercalation compound.

13. The battery cell according to claim 1, wherein the electrolyte contains, as the conductive salt, a halide, an oxalate, a borate, a phosphate, an arsenate, or a gallate of the active metal.

14. The battery cell according to claim 1, wherein the concentration of conductive salt in the electrolyte is at least 0.01 mol/l.

15. The battery cell according to claim 1, wherein the concentration of conductive salt in the electrolyte is at least 5 mol/l.

16. The battery cell according to claim 1, wherein the quantity of electrolyte, per Ah theoretical charge capacitance of the cell, is not more than 50 ml.

17. The battery cell according to claim 1, wherein the quantity of electrolyte, per Ah theoretical charge capacitance of the cell, is not more than 10 ml.

18. The battery cell according to claim 1, wherein it contains a separator that separates the negative and positive electrodes from one another, and prevents metallic lithium deposited at the negative electrode from penetrating to the surface of the positive electrode.

19. The battery cell according to claim 1, wherein it contains an isolator that separates the negative and positive electrodes from one another electrically, the isolator being formed and arranged in such a manner that active metal deposited on the negative electrode during charging of the cell may contact the positive electrode in such a manner that locally limited short-circuit reactions occur at the surface of the positive electrode.

20. The rechargeable electrochemical battery cell according to claim 1, wherein the total quantity of oxygen in the cell that is contained in compounds which are able to react with the sulfur dioxide in a reaction by which the sulfur dioxide is reduced, is not more than 5 mMol per Ah theoretical charge capacitance of the cell.

21. The rechargeable electrochemical battery cell according to claim 1, wherein the total quantity of oxygen in the cell that is contained in compounds which are able to react with the sulfur dioxide in a reaction by which the sulfur dioxide is reduced, is not more than 1 mMol per Ah theoretical charge capacitance of the cell.

22. The rechargeable electrochemical battery cell according to claim 1, wherein the total quantity of oxygen in the cell that is contained in compounds which are able to react with the sulfur dioxide in a reaction by which the sulfur dioxide is reduced, is not more than 0.5 mMol per Ah theoretical charge capacitance of the cell.

23. Battery cell according to claim 1, wherein the quantity of oxygen in the negative electrode that is contained in compounds which are able to react with the sulfur dioxide in a reaction by which the sulfur dioxide is reduced, is not more than 6 mMol per Ah theoretical charge capacitance of the cell.

24. Battery cell according to claim 1, wherein the quantity of oxygen in the positive electrode that is contained in compounds which are able to react with the sulfur dioxide in a reaction by which the sulfur dioxide is reduced, is not more than 8 mMol per Ah theoretical charge capacitance of the cell.

25. Battery cell according to claim 1, wherein the quantity of oxygen in the electrolyte that is contained in compounds which are able to react with the sulfur dioxide in a reaction by which the sulfur dioxide is reduced, is not more than 10 mMol per Ah theoretical charge capacitance of the cell.

26. Battery cell according to claim 1, wherein the electrolyte contains at least 5 mMol sulphur dioxide per Ah theoretical charge capacitance of the cell.

27. Battery cell according to claim 1, wherein the concentration of conductive salt in the electrolyte is at least 0.1 mol/l.

28. Battery cell according to claim 1, wherein the concentration of conductive salt in the electrolyte is at least 1 mol/l.

29. Battery cell according to claim 1, wherein the quantity of electrolyte, per Ah theoretical charge capacitance of the cell, is not more than 20 ml.

\* \* \* \* \*